United States Patent
Komatsu et al.

(10) Patent No.: US 8,438,553 B2
(45) Date of Patent: May 7, 2013

(54) PARALLELING PROCESSING METHOD, SYSTEM AND PROGRAM

(75) Inventors: Hideaki Komatsu, Kanagawa (JP); Arquimedes Martinez Canedo, Kanagawa (JP); Takeo Yoshizawa, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 12/629,114

(22) Filed: Dec. 2, 2009

(65) Prior Publication Data
US 2010/0138810 A1   Jun. 3, 2010

(30) Foreign Application Priority Data

Dec. 3, 2008   (JP) .................................. 2008-308660

(51) Int. Cl.
G06F 9/45   (2006.01)
(52) U.S. Cl.
USPC ......................................................... 717/151
(58) Field of Classification Search .......... 717/106–107, 717/149–151; 712/24–25, 200; 718/105
See application file for complete search history.

(56) References Cited

U.S. PATENT DOCUMENTS

| | | | | |
|---|---|---|---|---|
| 6,237,077 B1 * | 5/2001 | Sharangpani et al. | ........... | 712/24 |
| 6,341,371 B1 * | 1/2002 | Tandri | ........................... | 717/158 |
| 6,748,589 B1 * | 6/2004 | Johnson et al. | ............... | 717/150 |
| 6,988,266 B2 * | 1/2006 | Lam et al. | ...................... | 717/160 |
| 7,086,047 B1 * | 8/2006 | Edwards et al. | .............. | 717/160 |
| 2004/0015916 A1 * | 1/2004 | Click et al. | ..................... | 717/150 |
| 2004/0268334 A1 * | 12/2004 | Muthukumar et al. | ....... | 717/160 |
| 2008/0162870 A1 * | 7/2008 | Lin et al. | ........................... | 712/1 |
| 2010/0070958 A1 * | 3/2010 | Takagi | .......................... | 717/149 |

FOREIGN PATENT DOCUMENTS

| | | |
|---|---|---|
| CA | 2262277 A1 * | 8/2000 |
| JP | 3080337 | 4/1991 |
| JP | 6075786 | 3/1994 |
| JP | A9-97243 | 4/1997 |
| JP | A9-167144 | 6/1997 |
| JP | 2002116916 | 4/2002 |
| JP | 2007048052 | 2/2007 |
| JP | A2007-048052 | 2/2007 |
| JP | 2008515051 | 5/2008 |

* cited by examiner

*Primary Examiner* — Don Wong
*Assistant Examiner* — Daxin Wu
(74) *Attorney, Agent, or Firm* — Tutunjian & Bitetto, P.C.; Preston J. Young

(57) ABSTRACT

Paralleling processing system and method. When clusters are formed based on strongly connected components, a single cluster (fat cluster) having at least a predetermined number of blocks, or an expected processing time exceeding a predetermined threshold, is formed. The fat cluster is subjected to an unrolling process to make multiple copies of the processing of the fat cluster and to assign the copies to individual processors. Processing of the fat cluster is executed by the multiple processor devices in a pipelined manner. If a fat cluster to be iteratively executed cannot be executed in the pipelined manner because a processing result of an $n^{th}$ iteration of the fat cluster depends on a processing result of a preceding iteration of the fat cluster an input value needed for execution of the fat cluster is generated based on a certain prediction, and the fat cluster is speculatively executed.

20 Claims, 17 Drawing Sheets

(a)

FAT CLUSTER (b)

PARALLELING PROCESSING METHOD, SYSTEM AND PROGRAM

CROSS REFERENCE TO RELATED APPLICATION

This application claims priority under 35 U.S.C. from Japanese Patent Application 2008-308660, filed Dec. 3, 2008, the entire contents of which are incorporated herein by reference.

BACKGROUND OF THE INVENTION

1. Field of the Invention

The present invention relates to a technique for speeding up execution of a program in a multiprocessor system. More particularly it relates to speeding up iteratively executed processing in a multiprocessor environment.

2. Description of Related Art

In recent years, so-called multiprocessor systems having multiple processors have been used in the fields of scientific and technological calculation, simulation and the like. In such a system, an application program generates multiple processes and assigns the processes to individual processors. These processors execute the processing while communicating with each other by using, for example, a shared memory space A simulation field which has been particularly actively developed in recent years includes simulation software for plants for mechanical-electronic ("mechatronics") products such as robots, automobiles and airplanes. Thanks to developments of electronic components and software technologies, most parts of a mechatronics product such as a robot, an automobile or an airplane are electrically controlled by using, wire connections provided in a spreading fashion like a network of nerves, a wireless LAN; and the like.

These mechatronics products are mechanical devices in nature, but also include a large amount of control software. Therefore, the development of such a mechatronics product now requires spending long time, huge costs and a large number of staff to develop a control program and to test the program.

One of the conventional techniques used for such testing is hardware in the loop simulation (HILS). An environment particularly for testing an electronic control unit (ECU) in an entire automobile is called a full-vehicle HILS. In the full-vehicle HILS, an actual ECU is connected to a dedicated hardware device for emulating an engine, a transmission mechanism and the like in a laboratory, and then is tested according to a predetermined scenario. An output from the ECU is inputted to a computer for monitoring, and is presented on a display. While looking at the display, an operator conducting the test checks if there is any abnormal operation.

The HILS, however, requires a lot of effort for preparation because the HILS has to use the dedicated hardware device and requires the device to be physically connected with the actual ECU by wiring. Moreover, when a test is conducted by replacing the ECU with another one, a lot of work is required due to the necessity to again physically connect the device and the ECU. Furthermore, since the test uses the actual ECU, it takes time to conduct the test. Therefore, it takes an enormous amount of time to test many scenarios. Moreover, the hardware device for emulation of the HILS is generally very expensive.

A technique has been recently proposed for testing by using software configuration without using an expensive hardware device for emulation. This technique is called software in the loop simulation (SILS), in which all components to be installed in the ECU, such as a microcomputer, an I/O circuit and control scenarios, as well as all components in a plant such as an engine and a transmission are configured by use of a software simulator. According to the SILS, a test is executable without the hardware of an ECU.

One of systems for assisting the formation of SILS is, for example, MATLAB®/Simulink® that is a simulation modeling system available from CYBERNET SYSTEMS CO., LTD. With use of MATLAB®/Simulink®, as shown in FIG. 1, functional blocks A, B, . . . , M are arranged on a display screen by a graphical interface, and a simulation program can be created by specifying a process flow among the functional blocks as arrows indicate.

After the block diagram including the functional block A, B, . . . , M is created on MATLAB®/Simulink®, Real-Time Workshop® performs conversion of the simulation program to generate source codes in the C language so that the source codes can have functions equivalent to those presented in the block diagram. The source code in the C language is compiled into a program based on which a simulation is executable as SILS on another computer system.

With a multiprocessor system, in particular, it is advantageous, for the speed-up of processing, to divide the entire processing into as many processes as possible, and to cause the multiprocessor system to perform parallel processing by assigning different processes to the individual processors.

In a conventionally-used technique to achieve this, the functional blocks A, B, . . . , M are divided into multiple clusters 202, 204, 206, 208 and 210 as shown in FIG. 2, and each of the clusters is assigned to one of the CPUs. To implement such clustering, used is, for example, a technique of detecting strongly connected components, which is one of known compiler techniques. A main purpose of clustering is cost-cutting for communication between functional blocks within the same cluster.

However, the functional blocks have dependencies between them as shown in FIG. 2. Since the processing should not be parallelized irrespective of these dependencies, the paralleling of the processing must be accomplished under certain constraints.

Japanese Patent Application Publication No. Hei 9-97243 aims to shorten turnaround time of a program constituted of parallel tasks and executed in a multiprocessor system. In the disclosed system, a compiler generates an object program by compiling a source program of the program constituted by the parallel tasks, and generates an inter-task communication amount table for holding an amount of data exchanged between each task and other corresponding tasks of the parallel tasks. A task scheduler determines which one of the processors to be allocated to each of the parallel tasks based on the inter-task communication amount table and a processor communication cost table for defining data communication time per unit data between each pair of all the processors in the multiprocessor system. This determination is made so as to minimize communication time of the inter-task communications. Then, the task scheduler registers the determination result in a processor management table.

Japanese Patent Application Publication No. Hei 9-167144 discloses a program generation method for changing a parallel program for executing parallel processing. This parallel program includes descriptions of multiple kinds of calculation procedures and multiple kinds of communication procedures to be applied to communication processing among processors. In this method, when the time from the start to the completion of the parallel processing is shortened if a communication amount is increased in the communication processing executed in accordance with the communication procedures currently in use, the communication procedures are rearranged within the parallel program, and thereby the descriptions of the parallel program are modified so that two or more communication procedures will be merged together.

Japanese Patent Application Publication No. 2007-048052 relates to a compiler that optimizes parallel processing. The compiler records the number of execution cores that is the total number of processor cores to execute an object program. The compiler firstly detects dominant paths from the object program. The dominant paths are candidates for an execution path to be successively executed by a single processor core. Then, the compiler selects dominant paths as many as or less than the number of execution cores, and thereby generates clusters of tasks to be executed in parallel or successively by the multi-core processors. Thereafter, the compiler calculates an execution time of each of the generated clusters in the case where the cluster is executed by as many processor cores as each of natural numbers from one to the number of execution cores. Then, based on the execution time thus calculated, the compiler selects how many processor cores to be assigned for execution of each of the clusters.

However, these conventional techniques still do not provide any solution to constraints that the dependencies among functional blocks impose on the paralleling of processing. The present inventors consider that a part of processing to be iteratively executed is a bottle neck of the processing, and that the paralleling of the part largely contributes to a speed-up of the processing.

SUMMARY OF THE INVENTION

According to one aspect of the present invention, a computer implemented code generating method generating codes to be assigned to, and executed in parallel by, individual processors in a multiprocessor system includes the steps of: receiving source code of a program, the source code including a plurality of blocks connected one to another; clustering the blocks by detecting a strongly connected component; unrolling clusters to find a cluster that exceeds a predetermined threshold; making at least one copy of the cluster found in the unrolling step; and providing a process flow in which the cluster and the at least one copy of the cluster together form parallelized pipelines.

According to another aspect of the present invention, a paralleling execution method for causing processing to be assigned to, and executed in parallel by, individual processors in a multiprocessor computer system, includes the steps of: receiving source code of a program representing the processing, the source code including a plurality of blocks connected one to another; clustering the blocks by detecting a strongly connected component; unrolling clusters to find a cluster that exceeds a predetermined threshold; making at least one copy of the cluster found in the unrolling step; providing a process flow in which the cluster and the at least one copy of the cluster together form parallelized pipelines; generating a code for each of the clusters; compiling the codes to obtain executable codes; and causing the executable codes to be assigned to and executed by individual processors on a runtime environment.

In accordance with a further aspect of the present invention, a paralleling execution system for causing processing to be assigned to, and executed in parallel by, individual processors in a multiprocessor system, includes: a storage for storing source code of a program representing the processing, the source code including a plurality of blocks connected one to another; clustering means for clustering the blocks by detecting a strongly connected component; cluster unrolling means for (i) finding a cluster that exceeds a predetermined threshold, (ii) making at least one copy of the cluster thus found, and (iii) providing a process flow in which the cluster and the at least one copy of the cluster together form parallelized pipelines; means for generating a code for each of the clusters; a compiler for compiling the codes to obtain executable codes, respectively; and means for causing the executable codes to be assigned to and executed by individual processors in a runtime environment.

In accordance with a still further aspect of the present invention, a computer readable article of manufacture tangibly embodies a computer readable code generating program which, when executed through processing of a computer to generate codes to be assigned to, and executed in parallel by, individual processors in a multiprocessor system, causes the computer to execute the steps of: receiving source code of a program, the source code including a plurality of blocks connected one to another; clustering the blocks by detecting a strongly connected component; unrolling clusters to find a cluster that exceeds a predetermined threshold; making at least one copy of the cluster found in the unrolling step; and providing a process flow in which the cluster and the at least one copy of the cluster together form parallelized pipelines.

In accordance with a yet further aspect of the present invention, a computer readable article of manufacture tangibly embodies a computer readable paralleling execution program which, when executed, causes processing to be assigned to, and executed in parallel by, individual processors in a multiprocessor system, by causing the multiprocessor system to execute the steps of: receiving source code of a program representing the processing, the source code including a plurality of blocks connected one to another; clustering the blocks by detecting a strongly connected component; unrolling clusters to find a cluster that exceeds a predetermined threshold; making at least one copy of the cluster found in the unrolling step; providing a process flow in which the cluster and the at least one copy of the cluster together form parallelized pipelines; generating a code for each of the clusters; compiling the codes to obtain executable codes, and causing the executable codes to be assigned to and executed by the individual processors in a runtime environment.

BRIEF DESCRIPTION OF THE DRAWINGS

For a more complete understanding of the present invention and advantages thereof, reference is now made to the following description taken in conjunction with the accompanying drawings.

DETAILED DESCRIPTION OF THE PREFERRED EMBODIMENT

Figure 1:
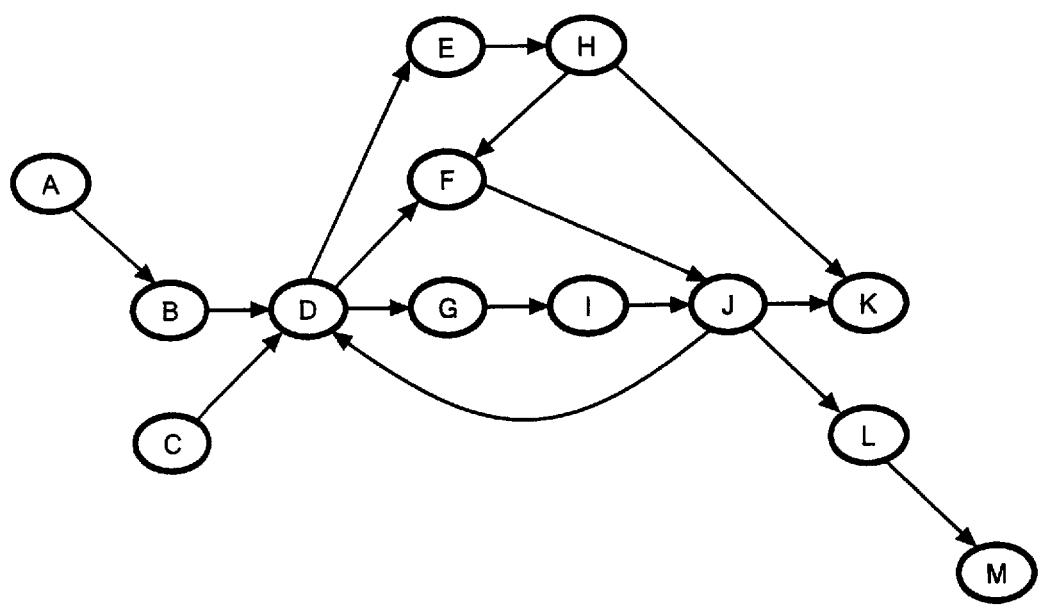
FIG. 1 is an example of a block diagram of a simulation modeling tool.
Figure 2:
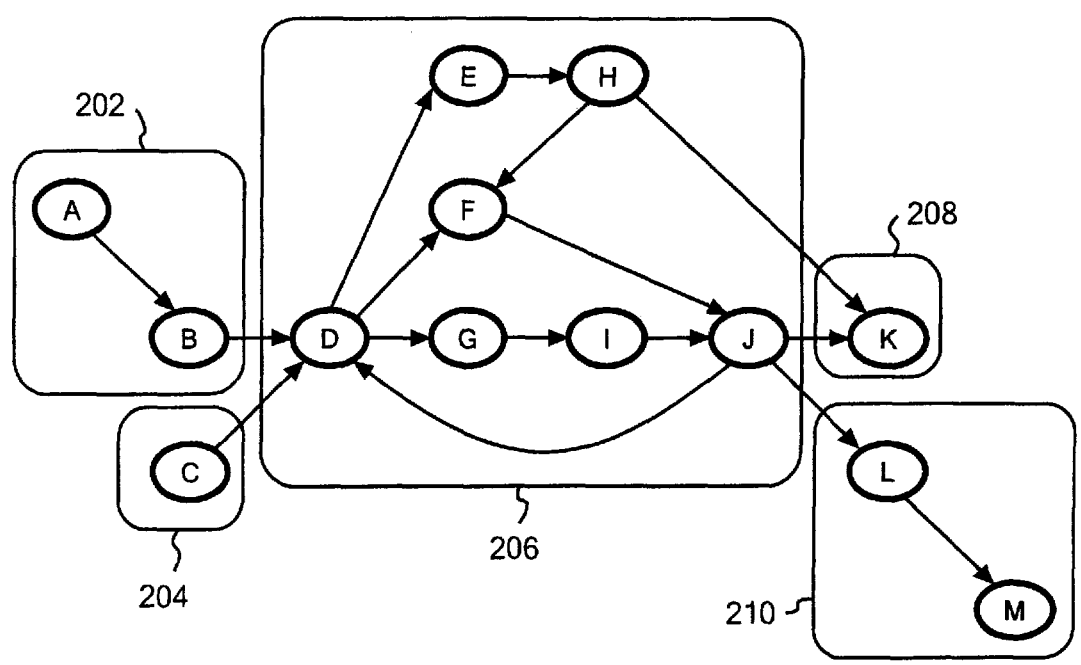
FIG. 2 is a diagram showing an example of clusters of blocks.

An object of the present invention to provide a technique for speeding up iteratively executed processing in a multiprocessor environment, the technique being used in clustering which generates clusters to be assigned to individual processors.

Another object of the present invention is to provide a technique suitable for execution of clustering and paralleling of a processing program having a graph structure typified by a block diagram and composed of multiple blocks and edges that represent a flow connecting these blocks to each other, the processing program including part of the multiple blocks to be iteratively executed.

Still another object of the present invention is to provide a parallel processing speed-up technique suitable for a full-vehicle simulation system for automobiles in a multiprocessor environment.

The foregoing object is accomplished through application of an unrolling technique for clusters according to the present invention. In other words, in the present invention, a processing program causes a program including multiple processing blocks to be clustered by finding strongly connected components through analysis of a source code. In the clustering, the clusters are properly merged to reduce a communication amount between the processors.

In a preferred embodiment, flattening processing is performed prior to this clustering step. To be more precise, there is a case where, in a simulation system such as Simulink®, one block includes another block called a subsystem. Since the subsystem itself includes an input port and output port, the flattening processing is performed by deleting the input port and output port from the subsystem, and then directly connecting logic in the subsystem to the outside.

At this time, if clusters are formed based on strongly connected components, a fat cluster is formed, especially in the case of a full-vehicle simulation system. The fat cluster mentioned here is defined as a cluster having a predetermined number or more of blocks, a cluster having an expected processing time longer than a predetermined threshold, or a cluster under another similar condition.

According to the present invention, unrolling process is applied to a cluster identified as the fat cluster. The unrolling process mentioned here is to make multiple copies of the processing of the fat cluster and assign the copies to individual processors, respectively. This unrolling process allows the processing to be executed in a pipelined manner on multiple processors, and thereby the processing is speeded up. However, in some cases, a fat cluster to be iteratively executed cannot be executed in a pipelined manner because a processing result of an $n^{th}$ iteration of the fat cluster depends on a processing result of its preceding iteration of the fat cluster. To cope with this case, an input value or the like needed for execution of the fat cluster is generated based on a certain prediction, and the fat cluster is speculatively executed. In addition, for the execution of the pipelined processing, a communication cost between processors is needed. For this reason, if the processing is pipelined by using an excessive number of processors, the processing is deteriorated rather than improved. To avoid this, it is necessary to determine an appropriate number of pipelines. In this description, the number of pipelines is called an unrolling factor.

In a preferred embodiment of the present invention, an appropriate unrolling factor is determined to optimize a function of an execution time expected for pipelines, which is a function including a processing time expected for a fat cluster, the number of iterations for a pipelined part, a rollback cost, a cost for loading the processing into the pipelines, the unrolling factor, and a speculation success rate. In this determination, a function not depending on the number of iterations of the pipelined part can also be used.

When the clusters and the unrolling factor for the fat cluster among the clusters are determined as described above, source codes to be assigned to individual processors, respectively, are determined. The source codes are complied as needed into executable codes, and the executable codes are assigned to and executed by the individual processors, respectively, on a runtime environment.

Hereinafter, a description is given of a configuration and processing of an embodiment of the present invention with reference to the drawings. In the following description, the same components are referred to with the same reference numerals throughout the drawings, unless otherwise noted. It should be understood that the configuration and processing described herein are provided only as one exemplary embodiment, and that the technical scope of the present invention must not be interpreted as being limited to this embodiment.

Figure 3:
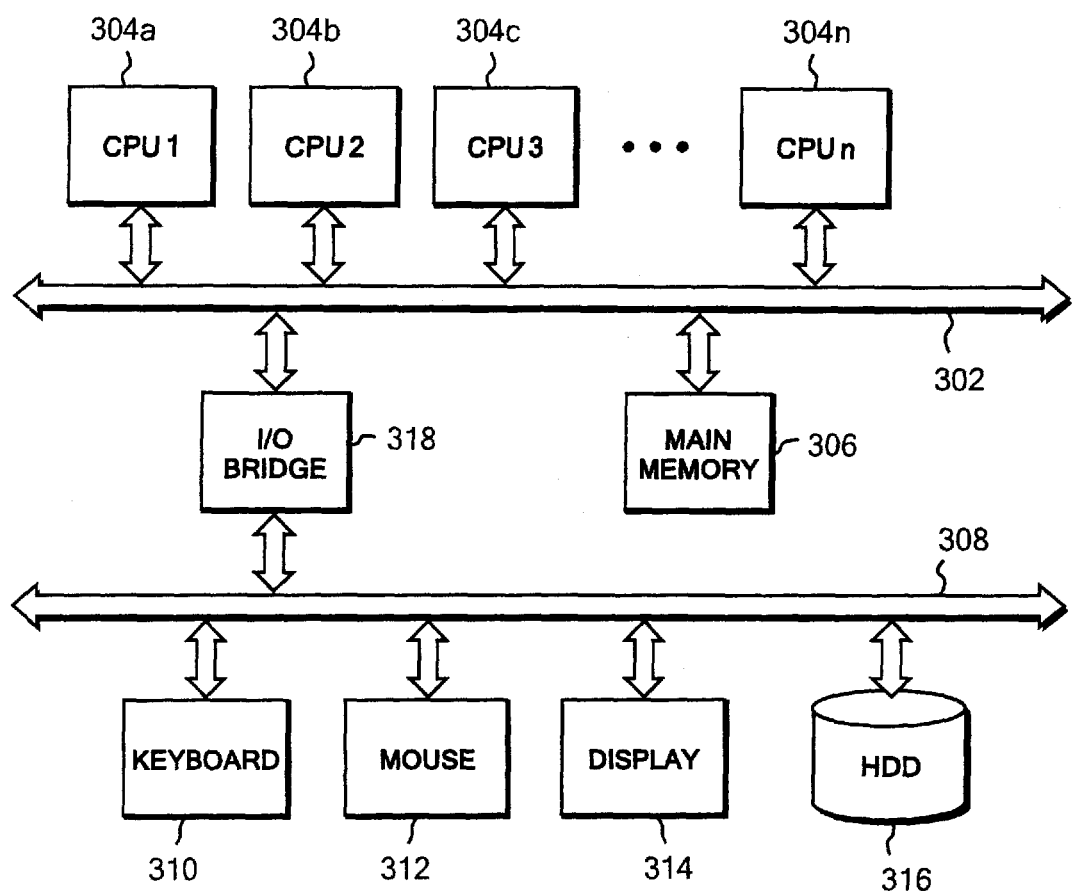
FIG. 3 is a block diagram of hardware for implementing the present invention.

First of all, with reference to FIG. 3, description is provided for hardware of a computer used to implement the present invention. In FIG. 3, multiple CPU1 304a, CPU2 304b, CPU3 304c, ..., CPUn 304n are connected to a host bus 302. In addition, a main memory 306 used for arithmetic processing of the CPU1 304a, the CPU2 304b, the CPU3 304c, ..., the CPUn 304n is also connected to the host bus 302.

A keyboard 310, a mouse 312, a display 314 and a hard disk drive 316 are connected to an I/O bus 308. The I/O bus 308 is connected to the host bus 302 through an I/O bridge 318. The keyboard 310 and the mouse 312 are used by an operator to operate the computer by inputting a command, clicking a menu, or doing the like. The display 314 is used to display, if necessary, a menu for operating, through a GUI, a program according to the present invention, which is described later.

Preferred hardware of a computer system to implement the present invention is IBM® System X. In this case, the CPU1 304a, the CPU2 304b, the CPU3 304c, ..., the CPUn 304n are, for example, Intel® Xeon®, and an operating system is Windows(trademark) Server 2003. The operating system is stored in the hard disk drive 316, and is loaded to the main memory 306 from the hard disk drive 316 upon startup of the computer system.

A multiprocessor system needs to be used to implement the present invention. Here, the multiprocessor system generally means a system using a processor having two or more cores with processor functions capable of independently performing arithmetic processing. Accordingly, it should be understood that the multiprocessor system is any of a multi-core single-processor system, a single-core multiprocessor system, and a multi-core multiprocessor system.

The hardware of a computer system to implement the present invention is not limited to IBM® System X, but may be any of computer systems that allow the simulation program to run thereon. Also, the operating system is not limited to Windows®, but may be any of operating systems such as Linux® and Mac OS®. Instead, a computer system such as POWER (trademark) 6 based IBM® System P with the operating system AIX (trademark) may be used to run the simulation program at higher speed.

In the hard disk drive 316, there are stored MATLAB®/Simulink®, a C compiler or a C++ compiler, modules for analysis, flattening, clustering and unrolling according to the present invention, a module for generating codes to be assigned to the CPUs, and a module for measuring an expected execution time of a processing block, which is described later. These tools and modules are loaded to the main memory 306 and then executed in response to a keyboard or mouse operation by an operator.

A usable simulation modeling tool is not limited to MATLAB®/Simulink®, and may be any simulation modeling tool such as open source based Scilab/Scicos.

Otherwise, in some cases, the source codes of the simulation system can be written directly in the C or C++ language without use of the simulation modeling tool. In this case, the present invention is applicable to the source codes in which all the functions are described as individual functional blocks having dependencies between them.

Figure 4:
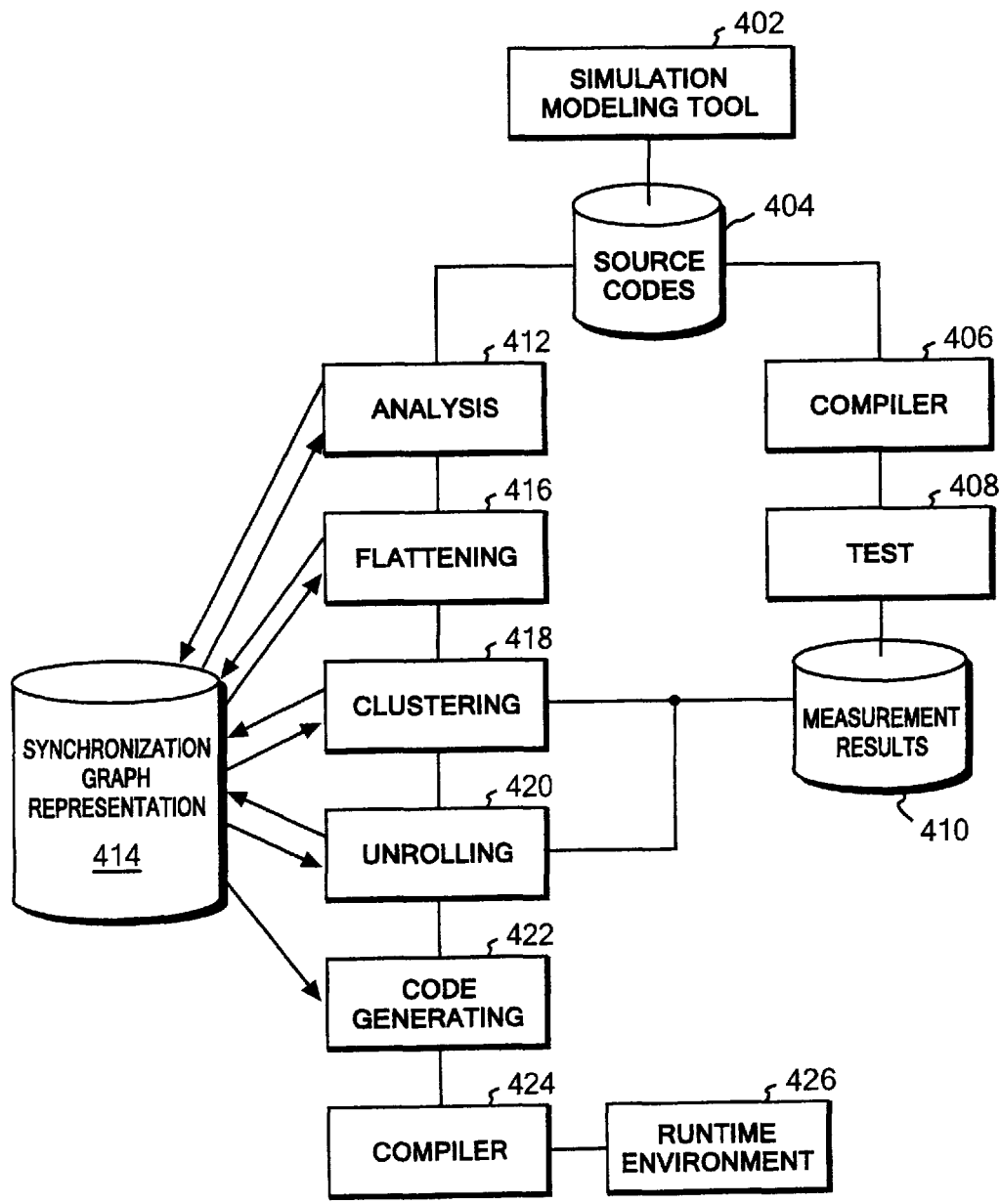
FIG. 4 is a functional block diagram of an embodiment of the present invention.

FIG. 4 is a functional block diagram according to the embodiment of the present invention. Each of blocks basically represents one of modules stored in the hard disk drive 316.

In FIG. 4, a simulation modeling tool 402 may be any existing tool such as MATLAB®/Simulink® or Scilab/Scicos. The simulation modeling tool 402 basically has a function of allowing an operator to depict a block diagram by arranging functional blocks on the display 314 through the GUI, describing necessary attributes such as mathematical expressions, and associating the functional blocks with each other if necessary. The simulation modeling tool 402 further has a function of outputting C source codes 404 including the descriptions of functions equivalent to those of the depicted block diagram. Other programming languages such as C++ and FORTRAN may be used in place of the C language. In particular, a later-described MDL file is in a format specific to Simulink®, and is for describing the dependencies among the functional blocks.

Instead, the simulation modeling tool can be installed in another personal computer, and source codes generated on the personal computer can be downloaded to the hard disk drive 316 through a network or the like.

The source codes 404 thus outputted are stored in the hard disk drive 316. The source codes 404 are complied by a compiler 406, and an executable program thus generated is passed to a test module 408.

The test module 408 has a run test executing function and a speculative test executing function. The run test is conducted in accordance with a given scenario, and the average processing time, the inter-processor communication time and the speculation success rate of each of blocks as shown in FIG. 1 are measured. In order to measure the average times, it is preferable to execute a single scenario multiple times. Measurement results 410 are stored in the hard disk drive 316 to be used later.

In the speculative test, the executable program generated by compiling is speculatively executed in accordance with another predetermined scenario. Through iterative executions of this scenario, measurements are made for three kinds of times: a processing time for speculation preparation, i.e., a processing time for storing a speculative input value to prepare for a case where rollback is to be performed due to a speculation failure; a processing time for checking a speculation success/failure, i.e., a processing time for determining whether actual data matches the speculative data, upon receipt of the actual data; and a processing time for rollback, i.e., a processing time for post-processing such as aborting the processing performed on the basis of an incorrect input and deleting the data, when the speculation turns out to be a failure, in other words, when the speculative input value and the actual value turn out to be different. Such values are also stored in the hard disk drive 316 as the measurement results 410 for the later use.

In fact, the speculation success rate can be calculated without actual execution of speculation. In the execution of the speculation, the processing is executed before reception of an input that should be inputted. For this reason, the processing is executed by use of a speculative value in place of the actual input value. Accordingly, the speculation success rate is equal to a hitting rate at which a speculative value matches an actual input value. This means that, if an algorithm for predicting a speculative input is determined, the prediction success rate of the prediction algorithm can be calculated only by using actual input data without actual execution of speculation (that is, without execution of block processing based on speculative input data). In other words, the speculation success rate can be obtained by simply recording an input to each block in a "run test," and calculating the prediction success rate of the speculative input prediction algorithm from the input data series.

A time required for execution of speculation and a time required when the execution of speculation failed cannot be obtained unless the speculation is actually executed. For this reason, a speculative test is carried out to obtain such information. Here, if an implementation manner for executing speculation is determined, then the processing times for speculation preparation, checking of a speculation success/failure and rollback for the case of speculation failure can be estimated as proportional to an input data amount. Accordingly, in a "speculative test," not all the blocks need to be speculatively executed. Through speculative execution of some blocks having different input data amounts, the relationship between input data amount and speculation-related processing time can be obtained, and costs for all the cases can be consequently calculated on the basis of the obtained relationship.

An analysis module 412 receives an input of the source codes 404, analyzes the syntax of the source codes 404, and thereby transforms the source codes 404 into a synchronization graph representation 414. The data of the synchronization graph representation 414 is preferably stored in the hard disk drive 316.

A flattening module 416 reads the synchronization graph representation 414, flattens each of the blocks in the synchronization graph representation 414 by unrolling a subsystem included in the block, and writes back the resultant flattened data as the synchronization graph representation 414. This flattening processing is later described in detail with reference to a flowchart in FIG. 7 and the drawings in FIGS. 8 and 9.

A clustering module 418 reads the synchronization graph representation 414, and performs two kinds of processing: for clustering by finding strongly connected components; and for reducing the number of clusters through cluster merge processing for communication amount reduction processing which is to be performed later. The clustering module 418 performs processing such as calculation of a communication time between clusters, by using the values of each block stored in the measurement results 410 according to the necessity, such as the values of the average processing time, the inter-processor communication time, the speculation success rate, the processing time for speculation preparation and the processing time for rollback. The result of clustering is written in the synchronization graph representation 414.

An unrolling module 420 reads the synchronization graph representation 414, and modifies the synchronization graph representation 414 so that a fat cluster can be unrolled, i.e., so that the processing of the fat cluster can be assigned to multiple processors in a pipelined manner by making multiple copies of the processing. The unrolling module 420 also refers to the values stored in the measurement results 410 if necessary.

A code generating module 422 generates a source code to be assigned to each processor, on the basis of the synchronization graph representation 414.

A compiler 424 compiles the source code thus generated, and assigns the compiled executable code to each of the CPU1 304a, the CPU2 304b, the CPU3 304c, . . . , on a runtime environment 426.

Figure 5:
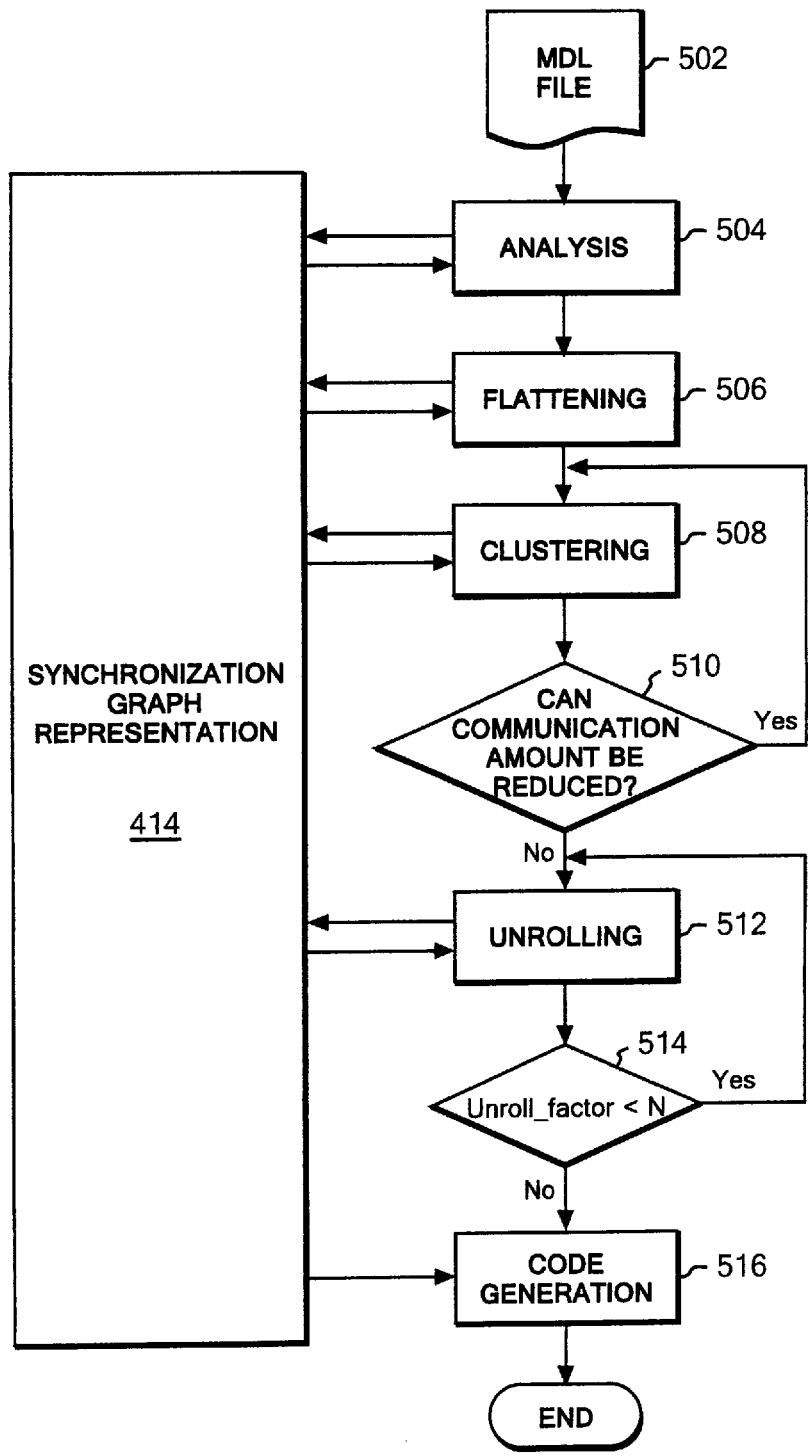
FIG. 5 is a diagram showing a process flow in the embodiment of the present invention.

FIG. 5 is a diagram showing the functional block diagram in FIG. 4 as a process flow. An MDL file 502 in FIG. 5 is stored in association with the source codes 404 in FIG. 4.

In step 504, the analysis module 412 analyzes the MDL file 502 and thereby generates the synchronization graph representation 414.

In step 506, the flattening module 416 reads the synchronization graph representation 414, and performs flattening.

In step 508, the clustering module 418 reads the synchronization graph representation 414, and performs the clustering processing. In a determination step 510, which is a part of the processing executed by the clustering module 418, it is determined whether the communication amount between clusters can be reduced or not. Here, a situation in which the communication amount between clusters can be reduced means that the communication amount between clusters can be reduced by incorporating a cluster into another cluster to form a merged cluster.

When the communication amount cannot be reduced further, even by merging more clusters, the processing advances to step 512. Then, in step 512, the unrolling module 420 unrolls a fat cluster, i.e., makes copies of the processing of the fat cluster and assigns the copied processing to the processors in the pipelined manner. This unrolling process in step 512 is iteratively executed until a variable Unroll-factor exceeds N as shown in step 514. Preferably, N is a value determined based on an expected processing time of a fat cluster, the number of iterations in the pipelined part, a rollback cost, a cost for loading the processing to the pipelines, and the speculation success rate. Once the variable Unroll-factor reaches N, the code generating module 422 generates the codes to be assigned to the processors in step 516.

Figure 6:
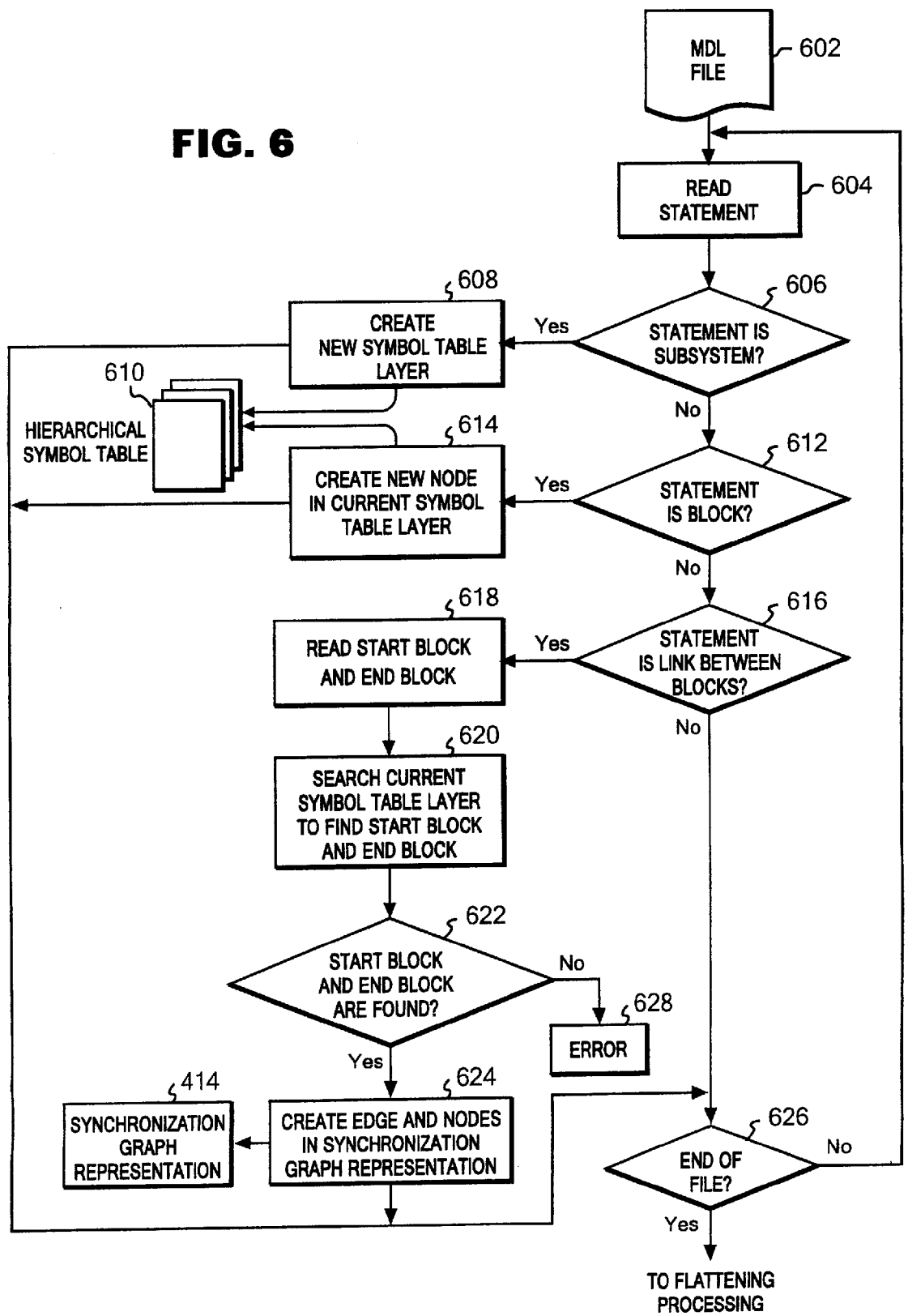
FIG. 6 is a diagram showing a flowchart of analysis processing.

FIG. 6 is a diagram showing details of the analysis processing in step 504 in the outline flowchart in FIG. 5. The processing shown in FIG. 6 is performed by the analysis module 412. An MDL file 602 in FIG. 6 is the same file as the MDL file 502 in FIG. 5.

In step 604, a statement is read from the MDL file 602. In step 606, whether the statement is a subsystem or not is determined. The subsystem mentioned here indicates a block further containing a block thereinside, as shown as a block 804 in FIG. 8.

A block is also called a system, and accordingly a subblock is called a subsystem. If the statement is a subsystem, a new symbol table layer is generated in step 608.

If the statement is not a subsystem, whether the statement is a block or not is determined in step 612. If the statement is a block, a new node is generated in the current symbol table layer in step 614.

If the statement is not a block, whether the statement is a link between blocks or not is determined in step 616. If the statement is a link between blocks, the start block and the end block of the link are read in step 618. Then, in step 620, the current symbol table layer is searched to find the start block and the end block.

Thereafter, if it is determined that the start block and the end block are found in step 622, an edge and nodes are generated in the synchronization graph representation 414 in step 624. The processing advances to step 626 of determining whether the processing itself reaches the end of the file. If it is determined that the processing reaches the end of the file in step 626, then the processing advances to the following flattening processing. If the processing is yet to reach the end of the file, the processing returns to step 604.

Here, return to step 622. If it is determined that the start block and the end block are not found in step 622, the processing is terminated as an error in step 628. In this case, the MDL file 602 needs to be modified or again created by using Simulink®.

Again, return to step 616. If the statement is not a link between blocks, the processing advances to step 626 of determining whether the processing reaches the end of the file. In this way, when it is determined that the processing reaches the end of the file, the generation of a hierarchical symbol table 610 and the synchronization graph representation 414 is already completed.

Figure 7:
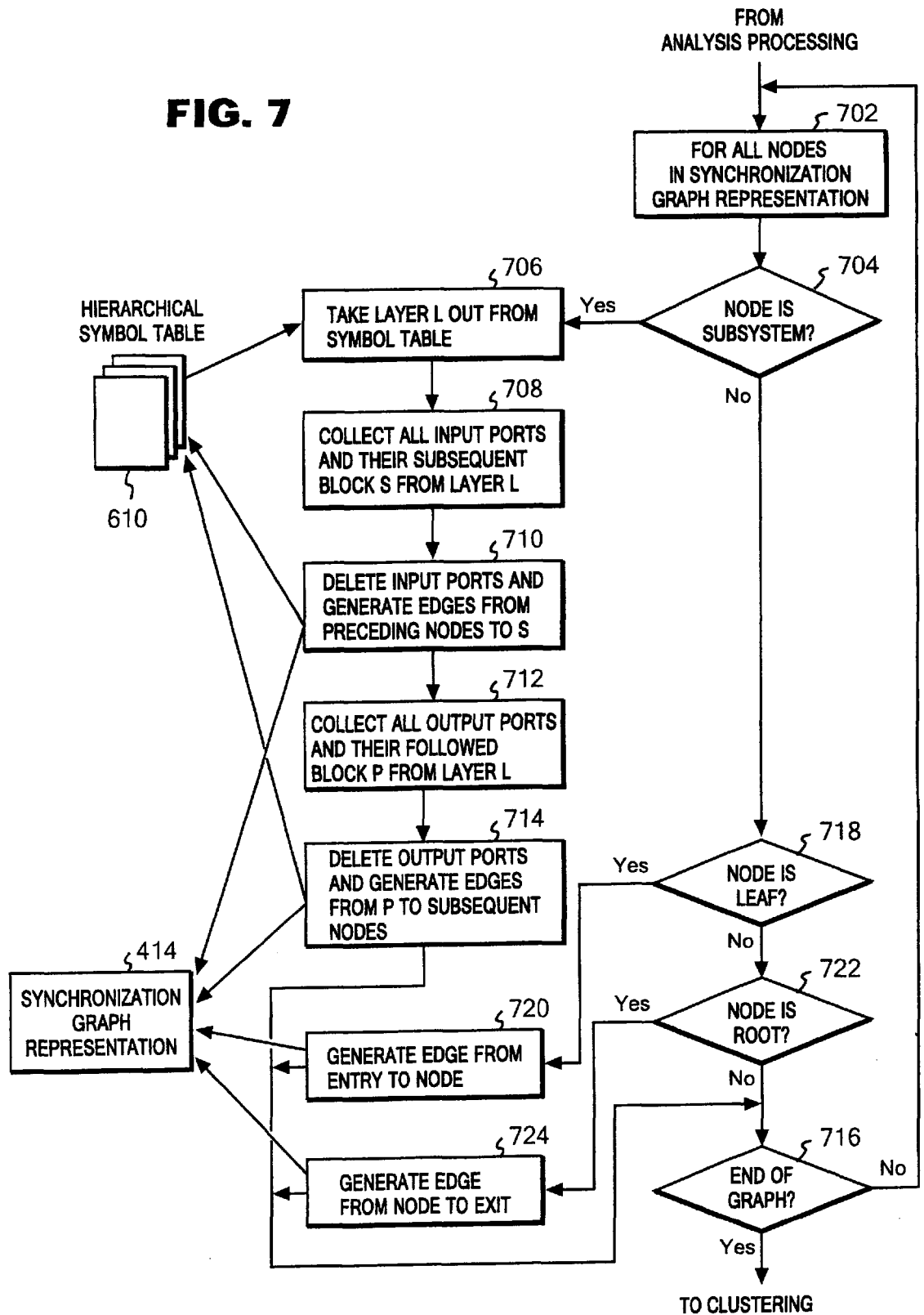
FIG. 7 is a diagram showing a flowchart of flattening processing.
Figure 8:
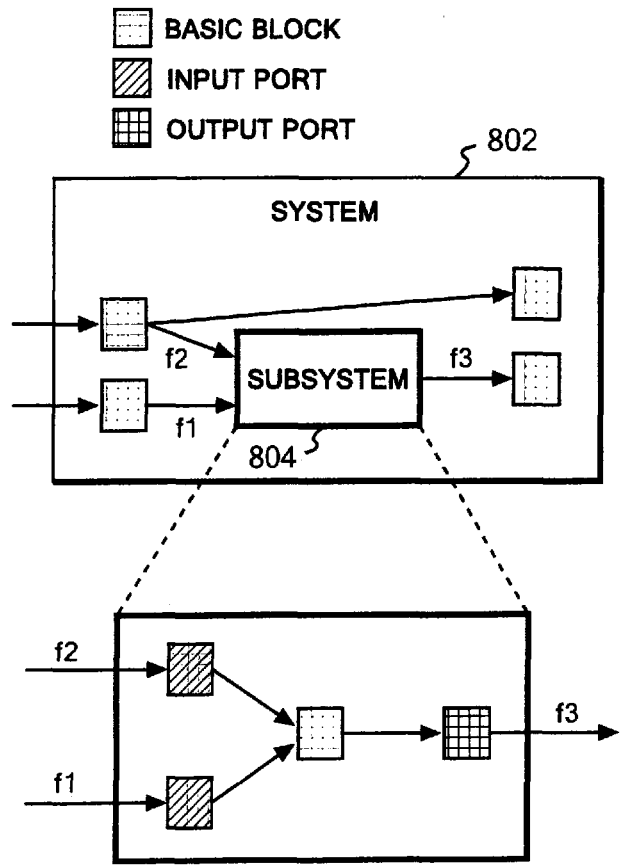
FIG. 8 is a diagram explaining flattening processing.

After that, the processing advances to the flattening processing shown in the flowchart in FIG. 7. FIG. 7 is a diagram showing details of the flattening processing in step 506 in the outline flowchart in FIG. 5. The processing shown in FIG. 7 is performed by the flattening module 416.

In step 702, an instruction is made to perform the following processing for all of the nodes, one by one, in the synchronization graph representation 414.

In step 704, whether a node is a subsystem or not is determined. If the node is a subsystem, a layer L corresponding to the node is taken out from the hierarchical symbol table in step 706. Then, in step 708, every input port and a block S following the input port are collected from the layer L.

Figure 9:
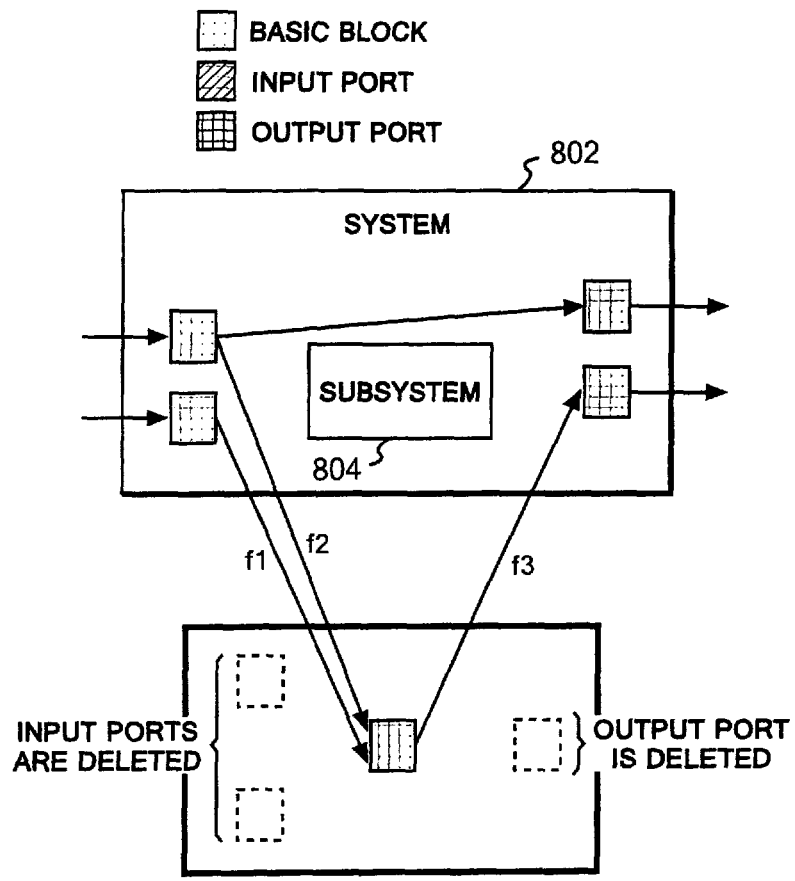
FIG. 9 is a diagram explaining the flattening processing.

In step 710, all of the input ports are deleted. In addition, edges from the preceding nodes to the block S are created. This deletion and creation are illustrated in FIG. 9.

In step 712, every output port and a block P followed by the output port are collected from the layer L. Next, in step 714, as shown in FIG. 9, the output port is deleted and an edge from the block P to its subsequent node is created. Thereafter, in step 716, whether or not the processing reaches the end of the graph is determined.

If it is determined that the processing reaches the end of the graph in step 716, the processing advances to the following clustering processing.

Instead, if it is determined that the processing is yet to reach the end of the graph, the processing returns to step 702, and is again performed for the next node in the graph.

If it is determined that the node is not a subsystem in step 704, the processing advances to step 718, in which whether the node is a leaf or not is determined. The leaf mentioned here indicates a node having no preceding node. If the node is a leaf, an edge from ENTRY (an entrance) to the node is created in step 720, and then the processing advances to the determination processing in step 716.

If it is determined that the node is not a leaf in step 718, whether the node is a root or not is determined in step 722. The root mentioned here indicates a node having no following node. If the node is a root, an edge from the node to EXIT (an exit) is created in step 724. Then, the processing advances to the determination processing in step 716.

Upon reaching the end of the graph in step 716, the flattened synchronization graph representation 414 is obtained. After that, the following clustering processing starts.

Figure 10:
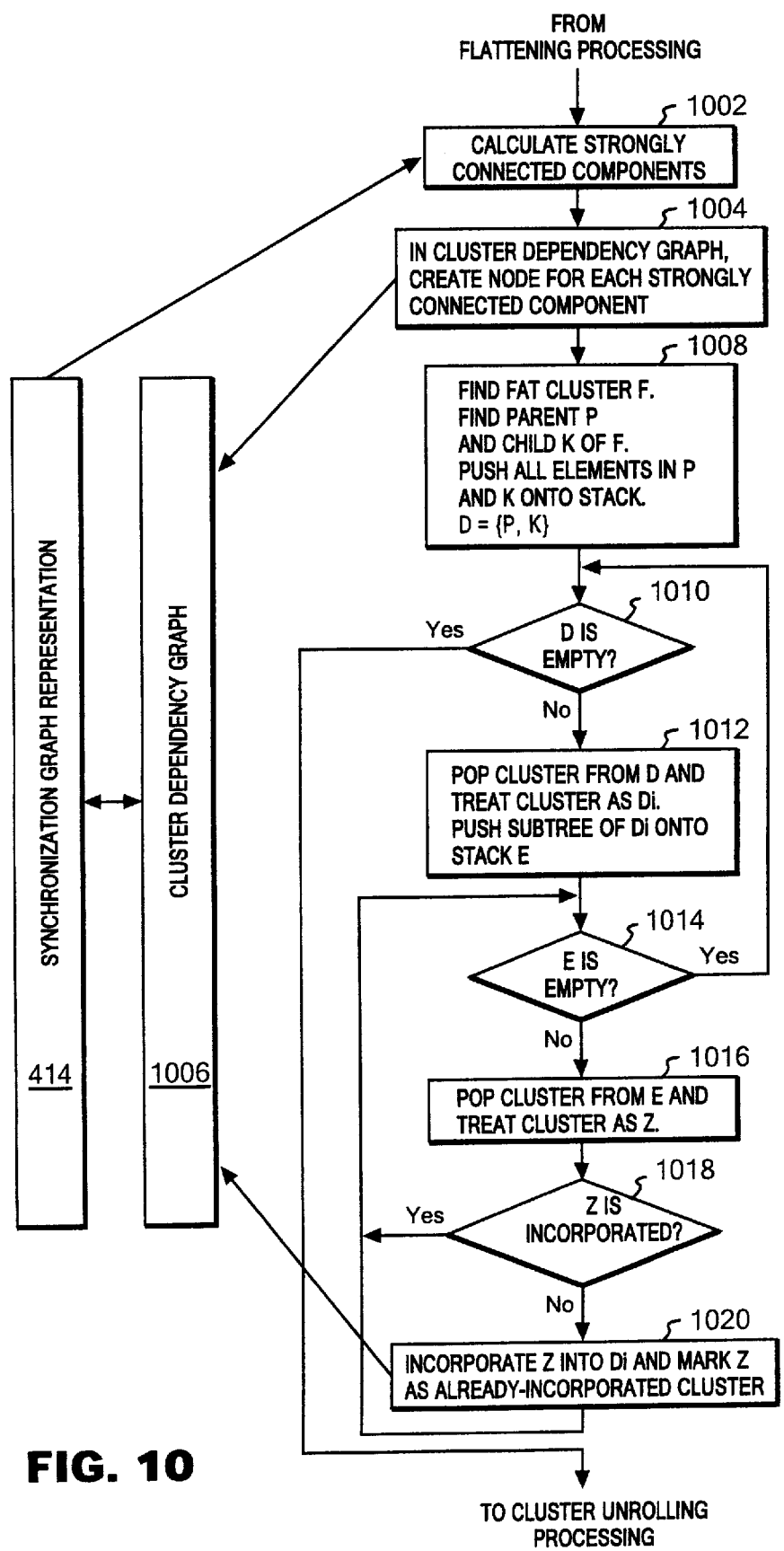
FIG. 10 is a flowchart of clustering processing.

FIG. 10 is a diagram showing details of the clustering processing in step 508 in the outline flowchart in FIG. 5. The processing shown in FIG. 10 is performed by the clustering module 418.

In step 1002, a calculation to find strongly connected components is made based on the synchronization graph representation 414 flattened by the flattening processing. If a control flow is a digraph, the term "strongly connected" indicates that, two given points on the digraph have a directed path between them. For techniques of finding strongly connected components in a control flow, refer to, for example, Japanese Patent Application Publications Nos. Hei 9-319722 and 2004-272826 filed by the present inventors.

If strongly connected components are found in step 1002, clustering is first performed based on the strongly connected components thus found, and then a node for each of the strongly connected components is created in a cluster dependency graph 1006 in step 1004. The cluster dependency graph has a graph structure presenting dependencies among nodes where each cluster is assumed as a single node after the clusters are generated.

In step 1008, a fat cluster F is found. The fat cluster is defined as a cluster under a certain condition, such as a cluster having a predetermined number or more of blocks, or a cluster having an expected processing time longer than a predetermined threshold. The processing time expected for a single cluster can be calculated by using any one or more values of each block stored in the measurement results 410 shown in FIG. 4, such as the average processing time, the inter-processor communication time, the speculation success rate, the processing time for speculation preparation, and the processing time for rollback. Note that the present inventors found that a block diagram of a simulation system particularly for a physical plant for automobile or the like is characterized in that its whole system forms a large loop structure, and has a tendency including such a fat cluster as described herein when clustering is performed according to the method of the present invention.

Generally speaking, the loopback edge of a loop is used as an input for the next iteration during the iterative executions of the system. For the purpose of unrolling and executing a fat cluster in a pipelined manner, it is necessary to predict a speculative output of the loopback edge, and to speculatively execute the fat cluster. It should be noted that the simulation for a general physical plant is characterized as suitable for speculative execution, because such a value to be inputted for next iteration tends to show sequential changes and therefore is easy to predict.

Figure 11:
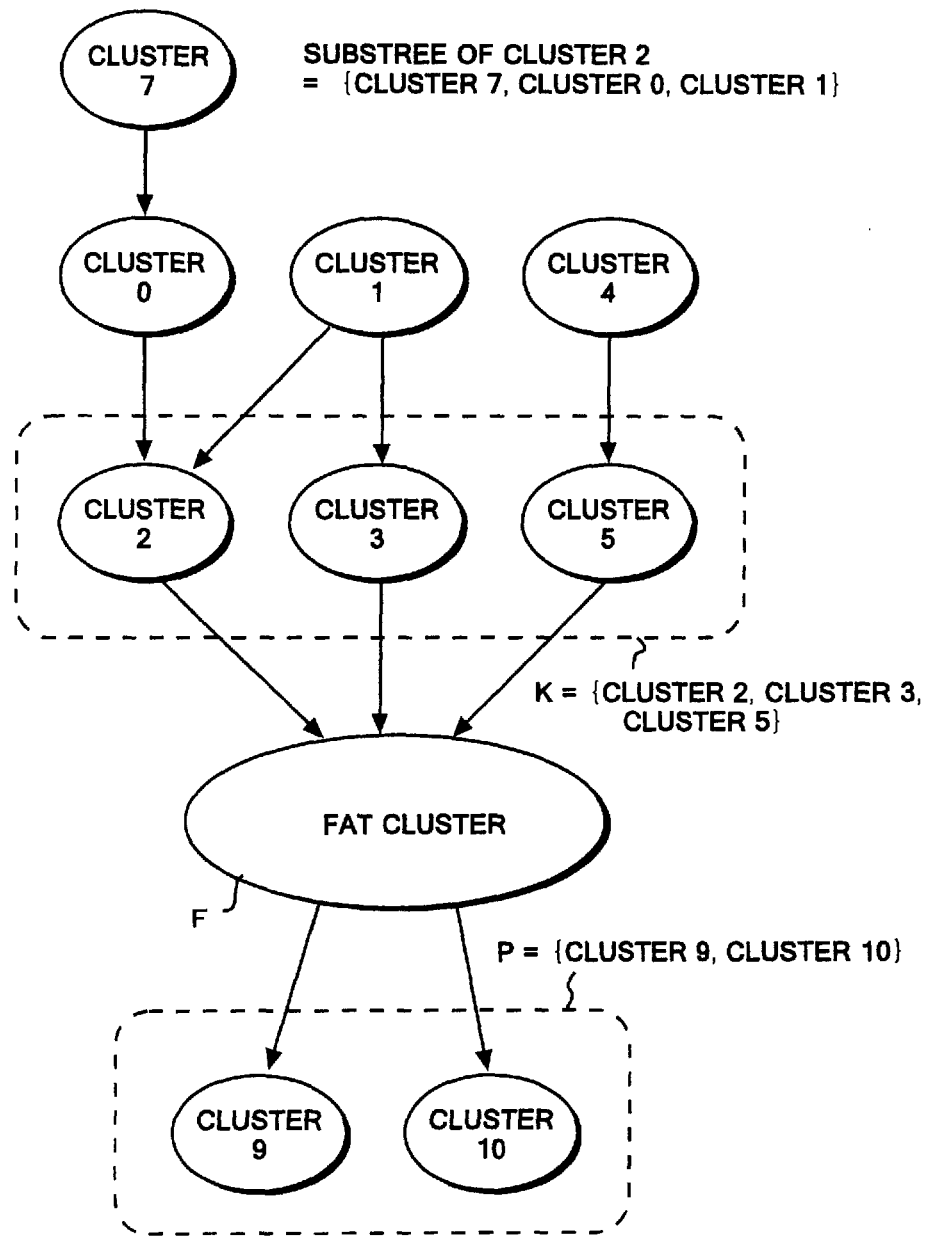
FIG. 11 is a diagram explaining clustering processing.

When the fat cluster F is found as described above, its parent clusters P and child clusters K are found. FIG. 11 shows the clusters thus found. In FIG. 11, a cluster 9 and a cluster 10 are parent clusters of the fat cluster F, and a cluster 2, a cluster 3 and a cluster 5 are child clusters of the fat cluster F. All the elements of the clusters P and K are pushed onto a stack D. That is, D={P,K}.

In step 1010, whether the stack D is empty or not is determined. If the stack D is empty, the processing advances to the following cluster unrolling process.

If the stack D is not empty, the processing advances to step 1012. In step 1012, a cluster is popped from the stack D, and the cluster thus popped is treated as Di. Then, a subtree of the cluster Di is pushed onto a stack E. Here, again referring to the example in FIG. 11, the cluster 7, the cluster 0 and the cluster 1 are shown as subtrees of the cluster 2.

In step 1014, whether the stack E is empty or not is determined. If the stack E is empty, the processing returns to the determination processing in step 1010.

If the stack E is not empty, a cluster is popped from the stack E, and the cluster thus popped is treated as Z. Next, in step 1018, whether or not the cluster Z is incorporated in the cluster Di is determined. If the cluster Z is not incorporated, the cluster Z is incorporated into the cluster Di and then is marked as an already-incorporated cluster in step 1020. Then, the processing returns to step 1014. If the cluster Z is incorporated, the processing immediately returns to step 1014. In essence, the processing herein is that a certain cluster is incorporated into another cluster, i.e., two clusters are merged together. The result of incorporation or merge in step 1020 is reflected in the cluster dependency graph 1006.

As a result of the entire processing, it is determined that the stack D is empty in step 1010. Then, the processing advances to the following cluster unrolling process.

Figure 12:
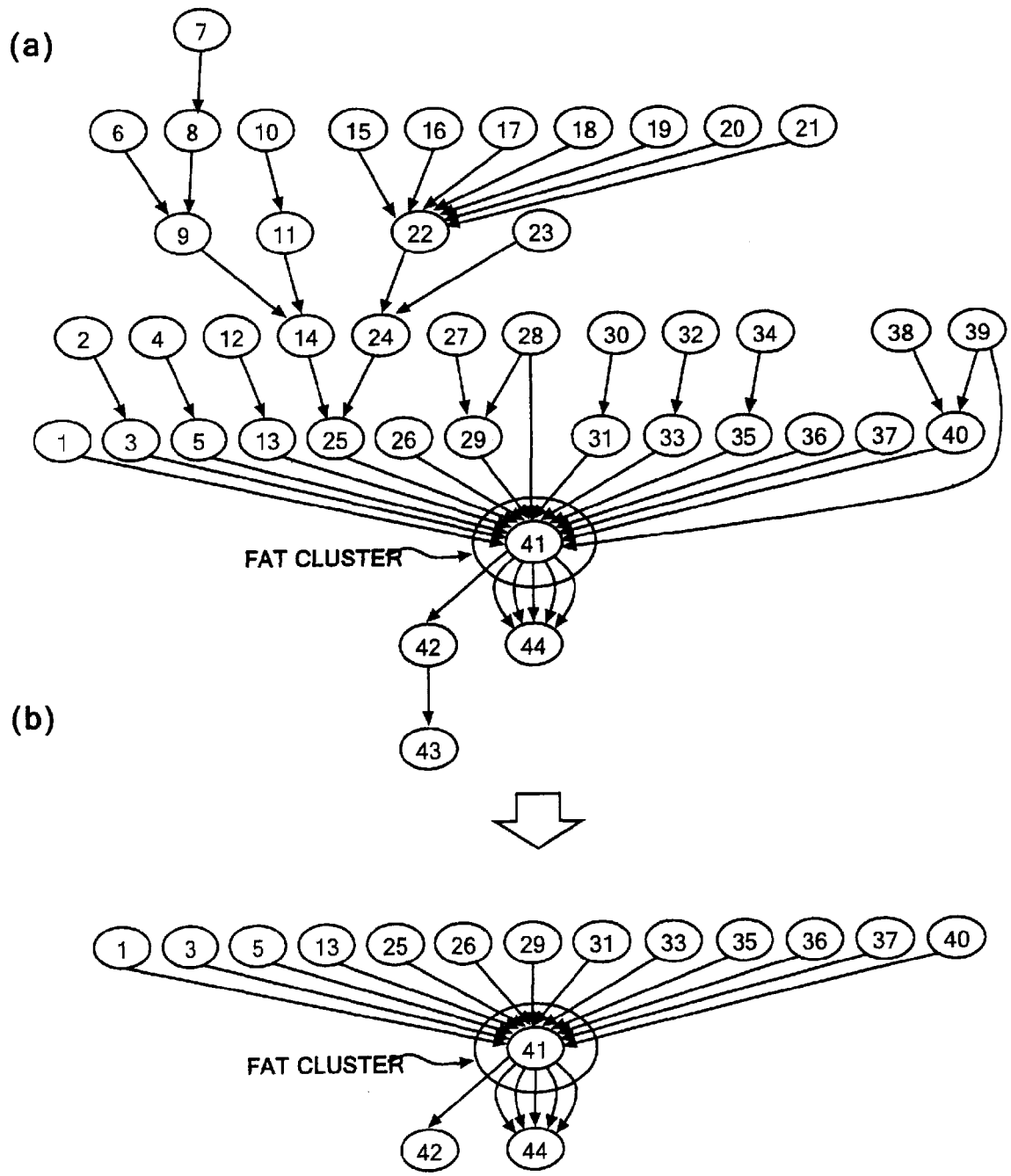
FIGS. 12A and 12B are diagrams showing an example of cluster incorporating processing.

FIGS. 12A and 12B show an example of the clustering processing based on strongly connected components and its subsequent cluster incorporating processing. If the clustering based on strongly connected components is performed on a given program expressed by a block diagram, a group of clusters are obtained as shown in FIG. 12A. This is a result from the processing in steps 1002, 1004 and 1008 in FIG. 10. The connection relationships between clusters are described in the cluster dependency graph 1006. Here, a number assigned to each cluster is an ID for the cluster in FIGS. 12A and 12B.

Then, as a result of the cluster incorporation in steps 1010, 1012, 1014, 1016, 1018 and 1020 in FIG. 10, a more simplified graph having a smaller number of clusters is obtained as shown in FIG. 12B. FIG. 12B shows disappearance of some of the clusters with the numbers shown in FIG. 12A. It should be understood that the clusters not existing in the graph are, in fact, incorporated into other clusters.

Figure 13:
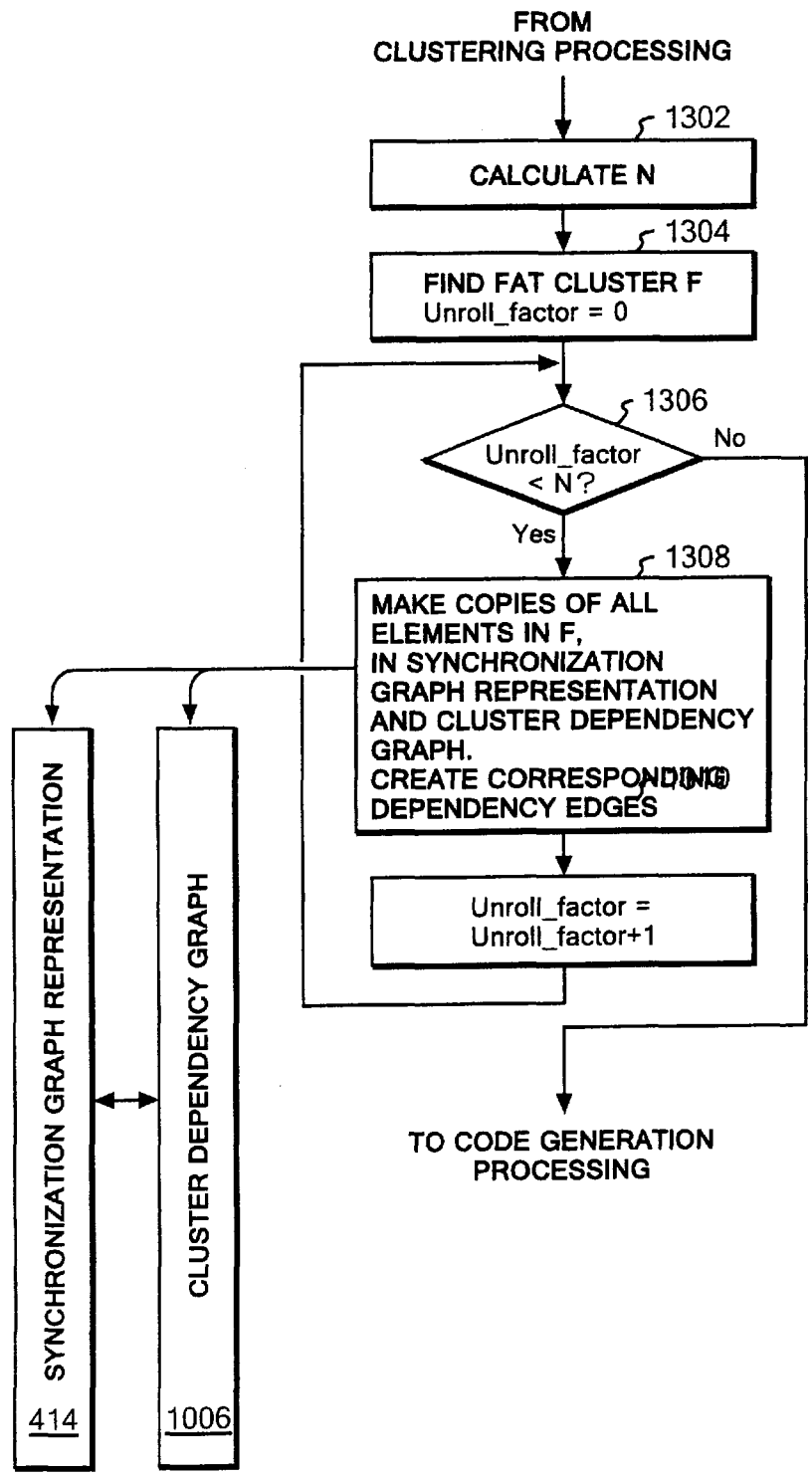
FIG. 13 is a flowchart of unrolling process.

FIG. 13 is a diagram showing details of the unrolling process in steps 512 and 514 in the outline flowchart in FIG. 5. The processing shown in FIG. 13 is performed by the unrolling module 420.

In step 1302, a parameter N for determining the number of pipelines is calculated. For this calculation, the following cost formula T(n) concerning pipelines is assumed.

$$T(n) = \frac{t \cdot i}{n} P(n) + (t + c) \cdot i (1 - P(n)) \qquad \text{[Formula 1]}$$

In this formula, t denotes a processing time for a fat cluster; i denotes the number of processing iterations; c denotes a rollback cost and a cost for assigning processing program to the pipelines; n denotes an unrolling factor; and P(n) denotes a speculation success rate where the unrolling factor is n. The values c and P(n) can be calculated from the values of the measurement results 410 in FIG. 4. Incidentally, the formula having i set to 1, for example, can be used in order to make the calculation result independent of the value i.

In step 1302, N is determined as n that minimizes the cost formula T(n), in principle. The term "in principle" means that there is an exceptional case because the number of usable processors is sometimes smaller than n that minimizes T(n). In this case, the number of usable processors is selected as N.

The aforementioned formula T(n) is only one example, and any other formula for representing the cost can be used. For example, one of usable functions is a function plotted based on the values obtained by a run test conducted in advance.

In step 1304, a fat cluster F is found. Then, the variable unrolling-factor is set to 0.

In step 1306, whether the unrolling-factor is smaller than N or not is determined. If so, copies for all the elements (nodes) in the fat cluster F are made in the synchronization graph representation 414 and the cluster dependency graph 1006 in step 1308. In addition, their corresponding dependency edges are generated.

In step 1310, the unrolling-factor is incremented by one, and the processing returns to the determination processing in step 1306. Then, when the unrolling-factor becomes equal to N, the processing advances to code generation processing.

Figure 14:
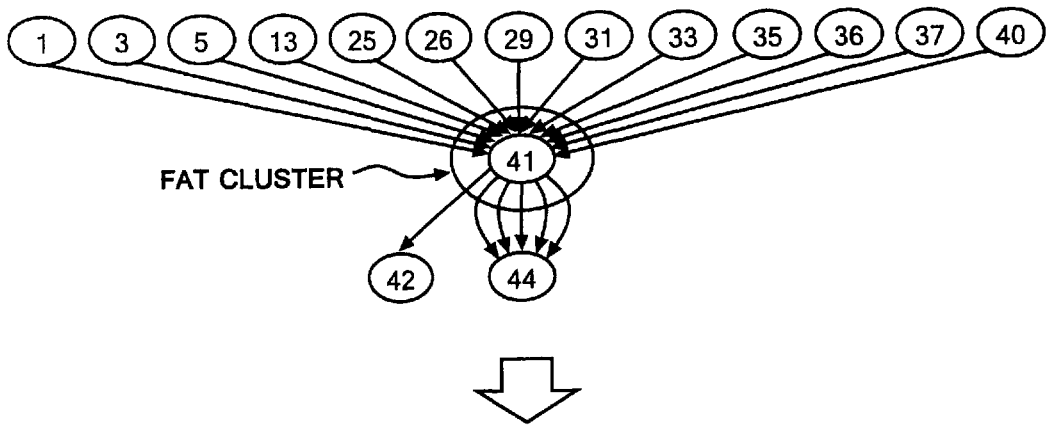
FIGS. 14A and 14B are diagrams showing an example of the unrolling process.
Figure 14:
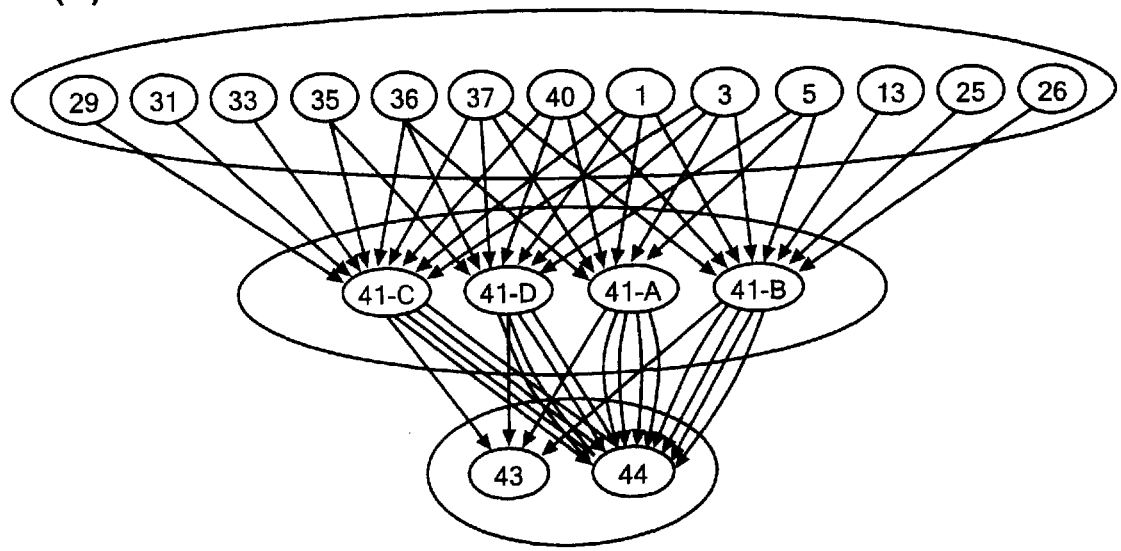

FIGS. 14A and 14B show the unrolling process of clusters. FIG. 14A is a graph representation of clusters generated as a result of the clustering processing shown in the flowchart of FIG. 10.

Then, the fat cluster is subjected to the unrolling process shown in the flowchart of FIG. 13, and is determined as four copies to be executed in parallel in a pipelined manner as shown in FIG. 14B.

Figure 15:
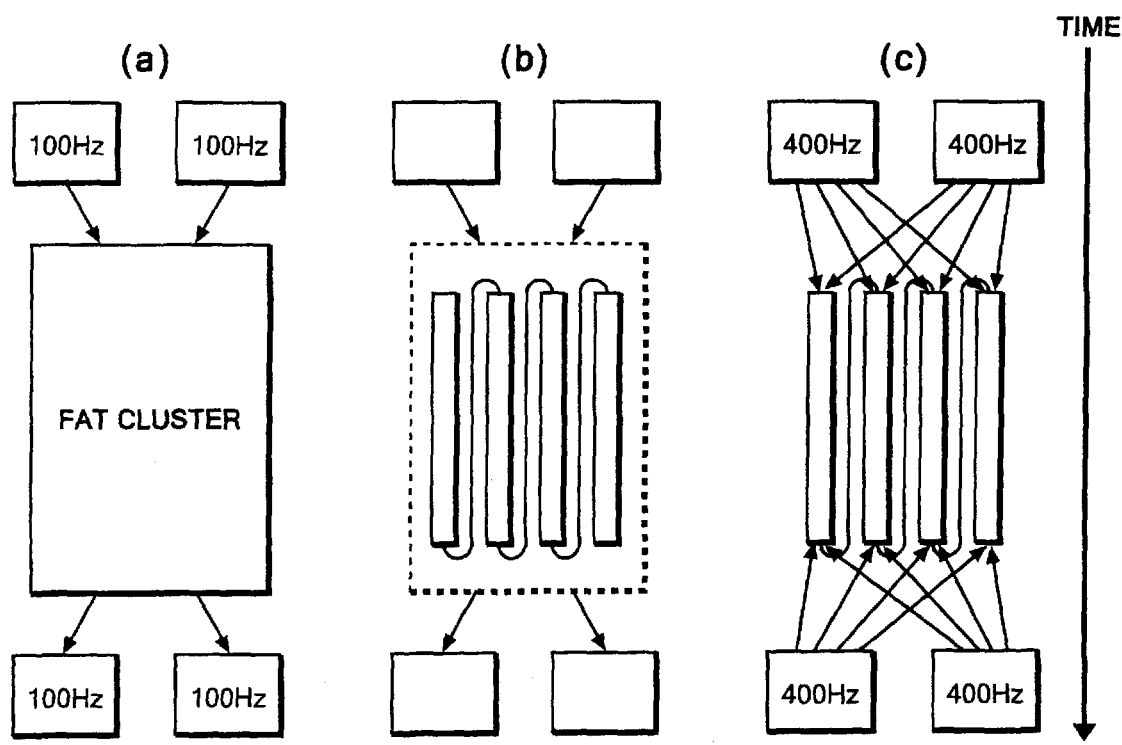
FIGS. 15A to 15C are diagrams explaining processing unrolled and thus executed in pipelined manner.

FIGS. 15A to 15C are schematic diagrams for explaining a parallel execution of a fat cluster in a pipelined manner. FIG. 15A is a diagram in which a fat cluster is executed normally without being unrolled. In this case, the processing is assumed to be performed at a clock speed of 100 Hz. Then, four copies of the fat cluster are made in FIG. 15B.

As a result, the fat cluster is pipelined by means of the four copies and the four copies are executed in parallel, in FIG. 15C. In theory, the fat cluster is made executable at a clock speed of 400 Hz that is four times faster than in the case of FIG. 15A. In fact, however, the processing speed as high as multiples of the number of copies cannot be achieved due to a communication cost between processors, a speculation cost and the like.

Figure 16:
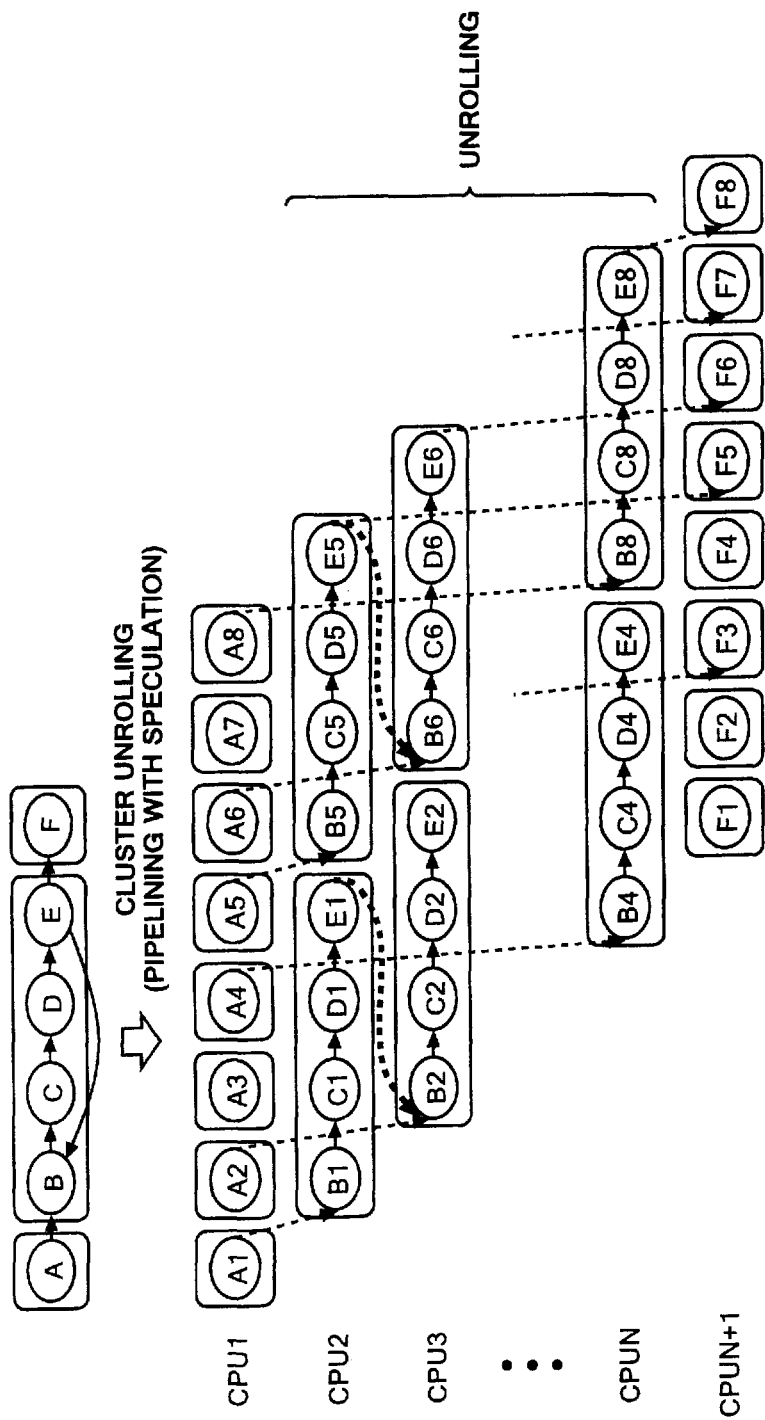
FIG. 16 is a diagram explaining processing unrolled and thus executed in a pipelined manner.

FIG. 16 is a diagram showing that block processing of blocks A, (B, C, D, E), F is pipelined. In this case, the part (B, C, D, E) is a loop for iteration. According to the technique of the present invention, the blocks A and F on the outer sides are assigned to a CPU1 and a CPUN+1, respectively, whereas the part (B, C, D, E) is assigned in parallel to all of a CPU2, a CPU3, . . . , a CPUN. As shown in FIG. 16, the loop of (B, C, D, E) is executed in pipelined manner by all of the CPU2, CPU3, . . . , CPUN.

At this time, the second iteration of the processing B (B2), for example, needs an input of a result of the first iteration of the processing E (E1). When the processing is executed in the pipelined manner, however, the result of the E1 is sometimes yet to be obtained at the time of starting the B2. In this case, the processing B2 and later is speculatively executed. In other words, instead of waiting for the actual output of E1, the processing B2 and later is started by using a speculative output from the E1. Then, after the processing result of E1 is actually calculated and outputted, the speculative output of E1 and the actual output of E1 are compared with each other. If a difference between these two outputs is not tolerable, the speculatively-executed processing B2 and later is aborted, and the processing B2 and later is restarted again. If the difference is tolerable, the speculatively-executed processing is continued.

In addition, a block diagram of a simulation system particularly for a physical plant for automobile or the like is characterized in that its whole system forms a large loop structure as described above. In a fat cluster appearing as a result of clustering according to the technique of the present invention, the loop edge appears in the form of a link from the block E to block B in FIG. 16. For this reason, the speculative execution is usually needed. The present inventors also found that the simulation for a general physical plant involves a value of such a loop edge that tends to show sequential changes and therefore is easy to predict, so that the simulation can be expected to be speeded up by the speculative execution.

Figure 17:
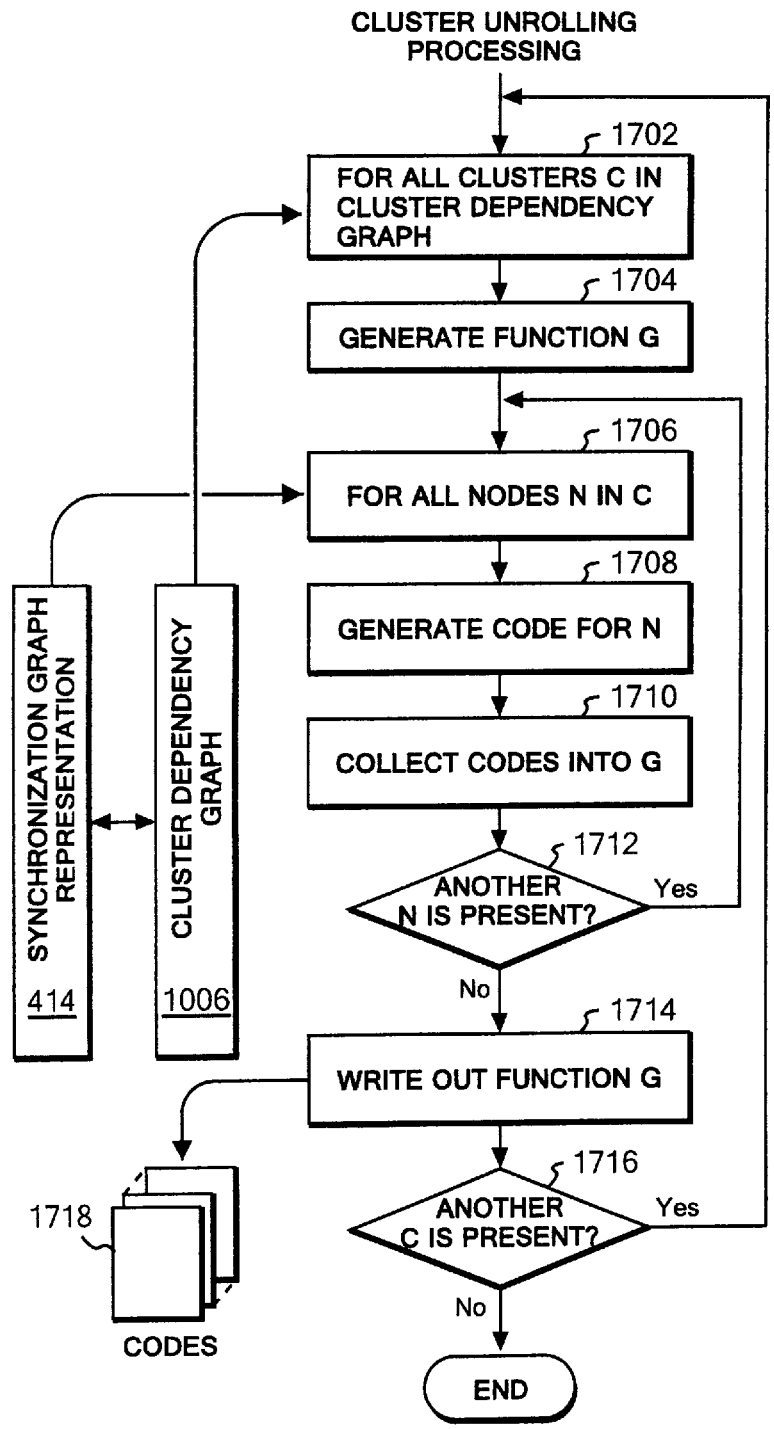
FIG. 17 is a flowchart of code generation processing.

FIG. 17 is a diagram showing details of the code generation processing in the outline flowchart in FIG. 5. The processing shown in FIG. 17 is performed by the code generating module 422.

In step 1702, all of the clusters C in the cluster dependency graph 1006 are sequentially acquired.

In step 1704, a function G is generated. In this stage, this function is empty.

In step 1706, all the nodes N of each of the clusters C are sequentially acquired.

In step 1708, a code for each node N is generated in reference to the synchronization graph representation 414.

In step 1710, the code of the node N thus generated is collected into the function G. Then, in step 1712, whether there is another node N yet to be acquired from the cluster C is determined. If there is such a node, the processing returns to step 1706, and then the next node N is acquired.

If it is determined that there is no node N yet to be acquired from the cluster C in step 1712, the function G is written out in step 1714. The code written out at this time is assigned to a single CPU.

In step 1716, whether there is another cluster C yet to be acquired is determined. If there is such a cluster, the processing returns to step 1702, and the next cluster C is acquired.

If it is determined that the processing for all the clusters C is completed in step 1716, the generation of a code 1718 to be assigned to each CPU is consequently completed.

The generated code is compiled by the compiler 424, and then is assigned to and executed by each of the CPUs on a runtime environment 426.

When processing of a program for a full-vehicle simulation or the like, which is executed by iterations of multiple processing blocks, is parallelized for multiprocessors, the present invention speeds up the processing of the program by pipelining processing on a fat cluster that is formed during the paralleling.

The present invention has been described based on the particular embodiment. The present invention, however, is not limited to this particular embodiment, but will be understood as applicable to other structures and techniques by being modified in various manners that those skilled in the art easily and obviously come up with. The present invention is not limited to the architecture of a particular processor, a particular operating system or the like.

The embodiment described above relates to paralleling of a simulation system of SILS mainly for automobiles. The present invention, however, is not limited to this example, but should be understood as widely applicable to a simulation system for air plane, robot, or any other physical system.

Although the preferred embodiment of the present invention has been described in detail, it should be understood that various changes, substitutions and alternations can be made therein without departing from spirit and scope of the invention as defined by the appended claims.

What is claimed is:

1. A computer implemented code generating method generating codes to be assigned to, and executed in parallel by, individual processor devices in a multiprocessor system, the method comprising the steps of:
receiving source code of a program, the source code including a plurality of blocks connected one to another;
clustering the plurality of blocks by detecting a strongly connected component;
unrolling clusters to find a cluster that exceeds a predetermined threshold;
making at least one copy of the cluster found in the unrolling step; and
providing a process flow in which the cluster and the at least one copy of the cluster together form parallelized pipelines.

2. The code generating method according to claim 1, wherein the step of clustering includes a step of merging clusters to reduce communication cost when the clusters are assigned to the individual processor devices.

3. The code generating method according to claim 1, wherein the predetermined threshold is the number of blocks in the cluster.

4. The code generating method according to claim 1, wherein the predetermined threshold is the processing time expected for the cluster.

5. A paralleling execution method for causing processing to be assigned to, and executed in parallel by, individual processor devices in a multiprocessor computer system, the method comprising the steps of:
receiving source code of a program representing the processing, the source code including a plurality of blocks connected one to another;
clustering the plurality of blocks by detecting a strongly connected component;
unrolling clusters to find a cluster that exceeds a predetermined threshold;
making at least one copy of the cluster found in the unrolling step;
providing a process flow in which the cluster and the at least one copy of the cluster together form parallelized pipelines;
generating a code for each of the clusters;
compiling the codes for each of the clusters to obtain executable codes; and
causing the executable codes to be assigned to and executed by the individual processor devices on a runtime environment.

6. The paralleling execution method according to claim 5, wherein the step of clustering includes a step of merging clusters to reduce a communication cost required when the clusters are assigned to the individual processor devices.

7. The paralleling execution method according to claim 5, wherein the predetermined threshold is the number of blocks in the cluster.

8. The paralleling execution method according to claim 5, wherein the predetermined threshold is the processing time expected for the cluster.

9. A paralleling execution system for causing processing to be assigned to, and executed in parallel by, individual processor devices in a multiprocessor system, the paralleling execution system comprising:
storage means for storing source code of a program representing the processing, the source code including a plurality of blocks connected one to another;
clustering means for clustering the plurality of blocks by detecting a strongly connected component;
cluster unrolling means for unrolling clusters by (i) finding a cluster that exceeds a predetermined threshold, (ii) making at least one copy of the cluster thus found, and (iii) providing a process flow in which the cluster and the at least one copy of the cluster together form parallelized pipelines;
means for generating a code for each of the clusters;
a compiler for compiling the codes for each of the clusters to obtain executable codes, respectively; and
means for causing the executable codes to be assigned to and executed by the individual devices in a runtime environment.

10. The paralleling execution system according to claim 9, wherein the clustering means comprises means for merging clusters to reduce communication cost when the clusters are assigned to the individual processor devices.

11. The paralleling execution system according to claim 9, wherein the predetermined threshold is the number of blocks in the cluster.

12. The paralleling execution system according to claim 9, wherein the predetermined threshold is the processing time expected for the cluster.

13. A computer readable article of manufacture tangibly embodying a computer readable code generating program stored thereon which, when executed through processing of a computer to generate codes to be assigned to, and executed in parallel by, individual processor devices in a multiprocessor system, causes the computer to execute the steps of:
receiving source code of a program, the source code including a plurality of blocks connected one to another;
clustering the plurality of blocks by detecting a strongly connected component;
unrolling clusters to find a cluster that exceeds a predetermined threshold;
making at least one copy of the cluster found in the unrolling step; and
providing a process flow in which the cluster and the at least one copy of the cluster together form parallelized pipelines.

14. The article of manufacture according to claim 13, wherein the step of clustering comprises a step of merging clusters to reduce communication cost when the clusters are assigned to the individual processor devices.

15. The article of manufacture according to claim 13, wherein the predetermined threshold is the number of blocks in the cluster.

16. The article of manufacture according to claim 13, wherein the predetermined threshold is a processing time expected for the cluster.

17. A computer readable article of manufacture tangibly embodying a computer readable paralleling execution program stored thereon which, when executed, causes processing to be assigned to, and executed in parallel by, individual processor devices in a multiprocessor system, by causing the multiprocessor system to execute the steps of:
receiving source code of a program representing the processing, the source code including a plurality of blocks connected one to another;
clustering the plurality of blocks by detecting a strongly connected component;
unrolling clusters to find a cluster that exceeds a predetermined threshold;
making at least one copy of the cluster found in the unrolling step;
providing a process flow in which the cluster and the at least one copy of the cluster together form parallelized pipelines;

generating a code for each of the clusters;

compiling the code for each of the clusters to obtain executable codes, and causing the executable codes to be assigned to and executed by the individual processor devices in a runtime environment.

18. The article of manufacture according to claim 17, wherein the step of clustering further comprises a step of merging clusters to reduce a communication cost required when the clusters are assigned to the individual processor devices.

19. The article of manufacture according to claim 17, wherein the predetermined threshold is the number of blocks in the cluster.

20. The article of manufacture according to claim 17, wherein the predetermined threshold is a processing time expected for the cluster.

* * * * *